US006680092B1

(12) United States Patent
Levy

(10) Patent No.: US 6,680,092 B1
(45) Date of Patent: Jan. 20, 2004

(54) COATING METHOD AND PRODUCTS OBTAINED BY SAME

(75) Inventor: Michel Levy, Esch/Alzette (LU)

(73) Assignee: Cabinet Erman S.A.R.L., Luxembourg (LU)

( * ) Notice: Subject to any disclaimer, the term of this patent is extended or adjusted under 35 U.S.C. 154(b) by 0 days.

(21) Appl. No.: 10/030,026

(22) PCT Filed: Jun. 30, 2000

(86) PCT No.: PCT/EP00/06143

§ 371 (c)(1), (2), (4) Date: May 10, 2002

(87) PCT Pub. No.: WO01/02186

PCT Pub. Date: Jan. 11, 2001

(30) Foreign Application Priority Data

Jul. 2, 1999 (LU) ............................................. 90412

(51) Int. Cl.$^{7}$ .......................... B29D 22/00; H05B 6/64; C25D 5/56

(52) U.S. Cl. ...................... 428/35.9; 428/195; 428/209; 219/678; 219/771; 205/158; 205/164; 205/183

(58) Field of Search ................................ 219/678, 771; 428/195, 209, 34.8, 35.3, 35.9; 205/238, 261, 164, 158, 183

(56) References Cited

U.S. PATENT DOCUMENTS

| | | | | | |
|---|---|---|---|---|---|
| 3,615,713 | A | * | 10/1971 | Stevenson | 99/171 H |
| 4,230,924 | A | * | 10/1980 | Brastad et al. | 219/10.55 |
| 4,685,997 | A | * | 8/1987 | Beckett | 156/629 |
| 5,006,684 | A | * | 4/1991 | Wendt et al. | 219/10.55 E |
| 5,256,846 | A | * | 10/1993 | Walters | 219/10.55 E |
| 5,300,746 | A | * | 4/1994 | Walters et al. | 219/10.55 E |
| 5,721,007 | A | * | 2/1998 | Lynch et al. | 427/98 |
| 5,759,422 | A | * | 6/1998 | Schmelzer et al. | 216/35 |
| 5,763,058 | A | * | 6/1998 | Isen et al. | 428/209 |
| 5,800,724 | A | * | 9/1998 | Habeger et al. | 216/35 |
| 6,399,879 | B1 | * | 6/2002 | Ueda et al. | 174/35 MS |

FOREIGN PATENT DOCUMENTS

EP 0 410 274 A2 * 1/1991

* cited by examiner

*Primary Examiner*—Cathy Lam
(74) *Attorney, Agent, or Firm*—Andrus, Sceales, Starke & Sawall, LLP

(57) ABSTRACT

The invention concerns a method for producing high resolution patterns on a support comprising the following steps: high resolution printing of a varnish on the support; treating the support by electrolysis; washing and drying the support.

38 Claims, 7 Drawing Sheets

COATING METHOD AND PRODUCTS OBTAINED BY SAME

CROSS REFERENCE TO RELATED APPLICATION

The present application is the U.S. national stage application of International Application PCT/EP00/06143, filed Jun. 30, 2000, which international application was published on Jan. 11, 2001 as International Publication WO 01-2186 in the French language. The International Application claims priority of Luxembourg Patent Application 90412, filed Jul. 2, 1999.

PRIOR ART

Numerous packaging material coating processes are known, the following being a non-exhaustive list:

- aqueous coating in which the liquid to be coated is a suspension or solution of an agent in water;
- solvent coating in which the liquid to be coated is a suspension or solution of an agent in one or more solvents;
- hot-melt coating in which the liquid to be coated is obtained by adjusting the agent to be deposited to a temperature which makes it liquid;
- solvent-free coating in which the agents to be deposited are in liquid form (monomers) and will cure and polymerise by catalysis;
- coating by evaporation of a solid which sublimes under vacuum onto the support;
- lamination coating in which the coating is a film which is attached to the support with an adhesive;
- transfer coating in which the agent to be deposited is already provisionally attached to a film to which it adheres poorly in order to be removed from the provisional support and finally attached to the final support by some known means.

The coating provided by these processes is generally complete, sometimes partial, but none of these coating methods allows the production of high resolution patterns.

U.S. Pat. No. 5,721,007 describes a process in which a support is coated with a metallic layer; an electrically insulating lacquer is printed at high resolution onto a first part of the coated support; one or more metallic layers are deposited onto a second part of said support, i.e. the part of the support not covered by the lacquer, by electrolysis in order to form the conductive tracks of the circuit; the electrically insulating mask is then removed in order to allow engraving of the support coating not covered by said metallic layer or layers deposited onto said support between the lacquer. This method is used, for example, in the production of electrical circuits, in particular for the production of flat cables. Although this method allows high resolution printing, it does not permit deposition of metal onto the lacquer.

OBJECT OF THE INVENTION

The object of the present invention is accordingly to provide a process for the production of a multilayer substrate having high resolution patterns and permitting deposition of metal onto the lacquer.

GENERAL DESCRIPTION OF THE CLAIMED INVENTION AND THE PRINCIPAL ADVANTAGES THEREOF

This object is achieved according to the invention by a process allowing the production of high resolution patterns and comprising the following steps:

- high resolution printing of a lacquer on the coated support;
- treatment of the support by electrolysis;
- washing and drying of the support.

According to an important feature of the invention, the lacquer is a charged lacquer. Said charged lacquer not only allows specific areas on the support to be protected, but also allows subsequent deposition of metal onto said charged lacquer.

High resolution printing of a lacquer onto a support allows the creation of fine and high resolution patterns on this support. This process is independent of the support and the support coating process. This process may, in principle, be applied to any support.

Before printing, the support may be coated with a layer which preferably comprises metal.

Said charged lacquer which may for example comprise conductive materials and/or materials acting as a barrier to or filtering electromagnetic waves.

The material acting as a barrier to or filtering electromagnetic waves preferably absorbs and/or reflects at least part of the electromagnetic waves.

Treatment of the coated support by electrolysis advantageously comprises electrolytic engraving of the coating on the unprinted part of the coated support.

According to one specific embodiment, said support is subjected to electrolytic deposition on the conductive printed part after washing and drying.

Treatment of said support by electrolysis comprises electrolytic deposition of one or more metals or the alloys thereof onto the printed part of the support.

The lacquer is preferably printed onto said support by photogravure. Photogravure is advantageously performed by a photogravure unit comprising at least one cylinder having printing zones consisting of engraved cells, the outermost cells of each pattern being interconnected to ensure linear continuity of the outlines. The cylinder cells are preferably arranged at a screen ruling of 175 to 700 cells per inch (per 2.5 cm), preferably of 350 cells per inch (per 2.5 cm). The cells of the outlines are preferably interconnected to achieve continuity of the graphical element and avoid any stepped appearance. Said photogravure unit is capable of printing a coating with very fine patterns of between 150 and 25 $\mu$m, preferably of 50 $\mu$m.

Engraving is preferably performed by electrolysis between the metallic coating of the support to be treated and an anode immersed in an aqueous electrolyte. Said anode is preferably a titanium anode consisting of folded sheet. Said aqueous electrolyte advantageously comprises an inorganic acid and the salt thereof or an inorganic base and the salt thereof, preferably NaOH+NaCl at a concentration of 10%. Once the lacquer has been applied onto the coated support, the electrolytic treatment of the support allows the removal of the coating from said support at those points where the lacquer was not applied. In this manner, a support comprising high resolution patterns is obtained. The electrolyte is selected such that the products released into the aqueous phase by electrolysis attack the metallic coating with a mixture of the acidic type and the salts thereof or alternatively with an alkali and the halogen salts thereof. Depending upon the electrolyte selected and the density of the printed pattern, products are obtained which have different characteristics with regard to reflection, transmission and absorption of incident electromagnetic radiation. Reflection and transmission rates may preferably range between 0 and 100%, while the absorption rate may range from 0 to 50%.

Electrolytic deposition is preferably performed by electrolysis of one or more metals and/or the alloy thereof, by dissolution of a soluble electrode containing at least the electrode metal or metals. The metallic deposit or successive metallic deposits allow(s) the creation of patterns with high resolution and high precision on a support.

The products of the process described above may have useful properties, especially for applications in the field of electromagnetic waves, in particular in the field of microwaves.

The process allows the production of multilayer products having very particular properties with regard to the reflection, transmission and absorption of incident electromagnetic radiation. Depending upon the particular case, incident electromagnetic radiation on the product maybe transmitted at a rate of 0 to 100%, reflected at a rate of 0 to 100% and/or absorbed at a rate of 0 to 50%. Such products have many and varied applications; they may be used, for example, as a filter for electromagnetic radiation, said filters being transparent to visible light. A heat-resistant polymeric film, for example of polyester, may be coated with a layer which heats up when the incident electromagnetic energy is partially absorbed by the coating. Said coating may be metallic with a resistivity of between 0.0005 and 0.1 ohm/square, preferably of 0.01 ohm/square, for example of aluminium with a thickness of between 0.001 and 1 $\mu$m. Under these conditions, the product is visually highly transparent and heats up to elevated temperatures (of the order of 200 to 300° C.) when struck by electromagnetic radiation and in particular by microwaves. The calorific energy may amount to up to 50% of the incident energy.

The quantity of energy which is absorbed, transmitted or reflected varies as a function of the dimensions and distribution of the coating applied to the film. Below a predetermined threshold, the transmitted energy is greater than the reflected energy; beyond this threshold, transmitted energy is less than the reflected energy.

By filling the lacquer with agents which enhance the electromagnetic wave absorption effect, it is possible to create products which are opaque to electromagnetic waves. In this way, it is for example possible to create film which is opaque to microwaves which could be applied to the window of a microwave oven door. By providing a grid with thin lines at a spacing of half the wavelength of the microwaves, a microwave barrier film is obtained which is almost completely transparent to visible light waves. Said film may be applied onto a microwave oven door, through which the interior of the microwave oven may readily be observed in complete safety.

The process also allows the creation of multilayer products. A second metallic deposit may be deposited onto a first metallic deposit by passing the support again through the printing station and the treatment station. Of course, the number of times the support passes through the printing and treatment stations and, consequently, the number of metallic deposits, is not limited to two.

Depending upon the nature of the coating and the filler in the applied lacquers, it is possible to create products, the composition of which is determined by the desired electromagnetic energy conversions. It is also possible to create barriers to electromagnetic radiation of certain wavelengths. Both options may optionally be combined to provide products which, as a function of wavelength, are both absorbent and reflective.

It is thus possible to create a package which reflects microwaves in one part of the package and absorbs part of the microwaves in another part. This makes it possible to use a microwave oven to heat foods which are to be adjusted to different temperatures.

The present invention also provides a multilayer product comprising the following layers:

- base support made from a material transparent to visible light and to electromagnetic waves,
- at least one high resolution metallic coating covering less than 5% of the area of the support,
- at least one layer of lacquer covering the metallic coating,
- in which the coating is arranged on the support in a pattern invisible to the naked eye, filtering a specific range of electromagnetic waves.

For the purposes of the present document, the term "filtering" means that between 0 and 99.9% and preferably between 0 and 95% of the incident waves pass through the product. The product may thus be virtually transparent or opaque to a specific range of electromagnetic wavelengths.

For the purposes of the present document, the term "transparent to visible light" means that between 80 and 99.9% and preferably between 90 and 95% of visible light pass through the product.

According to an advantageous embodiment, the product comprises an additional metallic coating layer which covers at least part of the lacquer layer.

According to another embodiment, the invention relates to a multilayer product comprising the following layers:

- base support made from a material transparent to visible light and to electromagnetic waves,
- high resolution lacquer covering at least 5% of the area of the support,
- at least one metallic coating covering the lacquer and filtering a specific range of electromagnetic waves,
- in product the lacquer is arranged on the support in a pattern invisible to the naked eye.

An additional lacquer layer may, at least in part, cover the metallic coating which may in turn be covered, at least in part, by an additional coating layer.

The base support is generally a film of a synthetic material, such as for example a polyester film. However, any other material may be suitable provided that it is transparent to visible light and to the selected range of electromagnetic waves. It is moreover necessary for it to be possible to cover such a material with a high resolution pattern comprising a coating and/or a lacquer.

The proposed product generally absorbs between 0 and 95% of the specific range of incident electromagnetic waves, reflects between 0 and 100% and/or transmits between 0 and 100% of the non-absorbed waves as a function of the pattern, the nature and quantity of the coating.

According to a particular embodiment, the product absorbs from 0 to 50% of the energy of the electromagnetic waves and reflects and/or transmits the non-absorbed energy.

The product thus comprises a filter for a range of electromagnetic waves and transparent to visible light; it may even comprise a filter which is opaque to electromagnetic waves and transparent to visible light.

In particular, the electromagnetic waves are, for example, microwaves and the product may consequently be used as packaging for microwaveable products, i.e. for packaging foodstuffs which may be reheated in a microwave oven.

DESCRIPTION ASSISTED BY FIGURES

Further peculiarities and features of the invention will emerge from the detailed description of several advantageous embodiments shown below by way of illustration with reference to the attached drawings, which show:

FIG. 1: a cross-section through a film at various stages (A, B and C) of production (uncoated support, lacquer with filler, electrolytic deposit)

FIG. 2: a cross-section of another film at various stages (A, B and C) of production (coated support, lacquer, engraving)

FIG. 3: a cross-section of yet another film at various stages (A, B, C and D) of production (coated support, lacquer with filler, engraving and deposit)

FIG. 4: shrinkable sleeve

FIG. 5: transparent film filter

FIG. 6: microwave oven door

FIG. 7: microwaveable packaging for coffee topped with whipped cream

FIG. 8: microwaveable meal tray

FIG. 9: overall diagram of a machine for performing the process

FIG. 10: detail of printing unit

FIG. 11: schematic diagram of printing unit

FIG. 12*a*: desired shape of an impression

FIG. 12*b*: photogravure window (engraved zone with continuity line in contact with engraved cells)

FIG. 12*c*: photogravure window (engraved zone with continuity line not in contact with engraved cells)

FIG. 12*d*: printed result

FIG. 13: schematic of physico-chemical treatment unit for film.

In the Figures, the same references denote identical or similar elements.

FIG. 1A shows a cross-section through a support film 10 on which (in FIG. 1B) is printed a discontinuous layer 20 of charged lacquer. FIG. 1C shows a metallic layer 30 deposited by electrolysis on the printed layer 20 of the film 10. It is thus possible to deposit a metallic layer 30 with a high resolution pattern onto a virgin film, i.e. onto a film without a continuous metallic coating. In this manner, it is possible to obtain films with high resolution metallic patterns on a film 10.

FIG. 2A shows a film 10 comprising a metallic coating 15. A protective lacquer 20 is printed (FIG. 2B) onto the coating layer and the part of said metallic coating which is not covered by the protective lacquer is removed (FIG. 2C) by electrolysis.

FIG. 3A shows a film 10 comprising a metallic coating 15. A protective lacquer 20 is printed (FIG. 3B) onto the coating layer and the part of the metallic coating which is not covered by the protective lacquer is removed (FIG. 3C) by electrolysis. After washing and drying, a metallic layer 30 is deposited on the protective lacquer layer. It is thus possible to manufacture multilayer materials.

It is, for example, possible to produce a heat-shrinkable sleeve consisting of a heat-shrinkable film. It may be intended for holding two tins together. Particular attention should be paid to the shrink zones which are in contact with the tins and will be provided with zones reactive towards microwaves. The parts of said sleeve not in contact with the tins will not undergo any heating in the microwave over and will thus not shrink, while selective heating will cause shrinkage of the perimeter of said sleeve, clamping the two tins together, for example to make them into a promotional offer.

FIG. 5 shows a heat-resistant polymeric film, preferably of polyester, coated with a layer which heats up when the incident electromagnetic energy is partially absorbed by the coating, which may be metallic, with a conductivity between 1 and 2,000 ohm/square, preferably 100 ohm/square, for example consisting of a layer of aluminium obtained by vacuum sublimation of a thickness of 10 to 10,000 Angström, preferably of an optical density of 0.6. Under these conditions, the packaging material is very highly visually transparent and heats up to 280° C. when electromagnetic radiation of a frequency of 2,450 MHz strikes it; the resultant calorific energy may amount to up to 50% of the incident energy.

By varying the dimensions of the coating, the quantity of energy absorbed, reflected and transmitted will be modified.

Below a threshold, the transmitted energy is greater than the reflected energy. Beyond this same threshold, reflected energy is greater than that transmitted.

Another exemplary embodiment is shown in FIG. 6 in which a film is applied against a microwave oven door.

By coating a film which is transparent to visible light with a protective lacquer comprising agents which enhance the absorptive and/or reflective properties of a film, it is possible to produce materials which are opaque to certain electromagnetic radiation while still remaining transparent to visible light. Said material comprises a coating of aluminium obtained by vacuum sublimation, of a thickness of at least 600 Angström covered with a lacquer filled with particles which enable an overall conductivity of between 1 and 10 ohm/square, preferably of 2.5 ohm/square, to be achieved. Said particles are preferably aluminium elements of small dimensions (5 to 15 $\mu$m, preferably 10 $\mu$m) obtained by vacuum deposition. The wavelength of domestic microwave ovens is 12.5 cm. The process according to the invention permits the production of 50 $\mu$m lines. Thus, with lines of aluminium approx. 10 $\mu$m thick, 50 $\mu$m wide and at half wavelength spacing, i.e. every 6.5 cm, a grid is obtained (FIG. 10) which is opaque to microwaves. The surface occupied by this grid is $(50\times65000\times2)/(65000)^2=0.15\%$ and it will be 99.85% transparent to visible light. A film which is almost completely transparent to visible light but is nevertheless opaque to microwaves is thus obtained. Said film may be applied against a microwave oven door. The door window is transparent to visible light and it is thus possible to observe what is happening inside the oven, but the microwaves are not transmitted through the door.

FIG. 7 shows a cover for a beverage of the type "coffee topped with whipped cream" which may be arranged over a vessel containing coffee in its lower part and cream floating on the coffee in its upper part before the beverage is heated in a microwave oven.

Before drinking the coffee topped with whipped cream, the consumer will place the vessel with its cover in a microwave oven to heat it.

The cover is arranged on the vessel and the upper part of the cover, which surrounds the cream, reflects microwave radiation while the lower part, which surrounds the coffee, absorbs some of the microwave radiation. As a result, said cream remains cold, while the heat generated by absorption of the microwave radiation in the lower part is transmitted to said coffee, so heating it. By using such a cover, a beverage is obtained with hot coffee and lukewarm, smooth cream.

Another example of use of a material according to the present invention is a meal tray, PR, for foods to be heated to different temperatures (FIG. 8).

Such a tray comprises a complete meal, for example with the following contents in its compartments:

a) a starter: asparagus with vinaigrette dressing b) a main course: fish in a sauce c) a dessert: ice cream.

The starter (a) must be eaten lukewarm, the main course (b) hot and the ice cream (c) cold. These three types of food will be arranged on a thermoformed meal tray, PR, which is sealed by a lid (not shown) to form enclosures which communicate with the exterior only by means of vents (not shown). Around the compartment (a) for the starter, a film is arranged on the walls formed by the tray and the lid to create an enclosure (a) with a metallic coating of a conductivity of 0.1 Mohm/square; enclosure (b) around the fish will have no coating and enclosure (c) will be coated with a multilayer film which will be equivalent to that providing a barrier to microwave radiation (FIG. 6), such that the ice cream is not heated. Placing the tray, PR, in a microwave oven for 90 s results in the asparagus in compartment (a) being at 25° C., the fish in compartment (b) at 35° C. and the ice cream in compartment (c) at 0° C., starting from a tray, PR, straight from the deep-freeze.

Depending upon the nature of the energy conversion layer comprising the coating of the printed lacquer or lacquers optionally containing a filler, the electrolytic deposit or deposits and the electrolytic engraving or engravings, it is possible to produce materials, the composition of which will be determined by the desired electromagnetic energy conversions and even to produce barriers to electromagnetic radiation for certain wavelengths and, optionally, to combine both options in order to provide products which, as a function of wavelength, are both absorbent and reflective.

FIG. 9 shows an installation for performing the process described above. This installation comprises a feed station A which accommodates the film provided with its base layer BA1 wound on a reel. In said feed station, the reel is unwound to supply a heliogravure printing station B; then, on leaving said photogravure printing station, the strip BA2 passes into an electrolysis station C which performs the physico-chemical treatment of the windows of the film BA3. Downstream from this electrolysis station C is a washing station D in which the water-soluble lacquer is optionally removed to yield the film BA4 and the strip is rinsed. Said strip BA4 then passes into a drying station E and, finally, into an inspection station F before arriving at the winder G.

The feed station A comprises an unwinder A1 which holds the reel A2. This unwinder is driven by a motor controlled by a delivery unit A3, which maintains a specified tension in the strip BA1. The strip then passes into the printing station B which comprises a printing unit (FIGS. 10 and 11) with an ink fountain B1, a photogravure cylinder B2 immersed in the ink fountain B1 to cover the surface provided with photogravure cells and the outline of the window. This cylinder interacts with a doctor blade B3 which removes the ink from the surface to leave behind only the ink inside the cells or the engraving. The ink fountain B1 is supplied by means of a pump B5 and a line B6 from a reservoir B4 containing the coating agent. Said reservoir B4 is provided with a viscosity detection means B6, such as a viscosimeter, so that the viscosity of the coating liquid may be controlled.

The photogravure unit B may be equipped with a spot reading system, or a marker detectable by a photoelectric cell, arranged on the metallised strip which will allow the strip to be guided, such that the position of the printing window is in register with the patterns on the metallised strip comprising optionally preprinted graphic elements.

The level of liquid in the ink fountain B1 is controlled by an overflow B7 with a return line to the reservoir B4, such that the photogravure cylinder B2 is always immersed to the same depth in the ink fountain B1.

The cylinder B2 interacts with a presser roller B10 located above said strip BA1, cylinder B2 being located below the strip.

Said strip BA1 is composed schematically, as shown in FIG. 3 , of a support 10 of a plastics material and a base coating 15, such as a metal.

While turning in the direction of the arrows, the photogravure cylinder B2, with the presser B10, compresses said strip BA1 and leaves lacquer impressions corresponding to the printing windows or zones or coatings, I, corresponding to the windows.

FIG. 11 is a top view of the printing unit shown in FIG. 10. This Figure shows the photogravure cylinder B2, the presser roller B10 with an arrow indicating the compression, together with the strip BA from above. The photogravure cylinder B2 has a surface engraved in accordance with a photogravure window or printing zone B21 of a relatively complicated shape which creates the impression I of the lacquer on the under surface 15 of said strip BA1 (which then becomes strip BA2).

FIG. 12A shows the desired outline of the photogravure window, i.e. the outline of the future graphic element (I100).

On the basis of this shape I100, the surface of the photogravure window is engraved into the cylinder. This window consists of an engraved surface comprising reservoirs or cells K100, separated by low walls K101, the whole being surrounded by a rule K102, which adjoins the reservoirs and the gaps between the reservoirs K100.

In this Figure, the cells are represented by black squares with rounded corners, said squares being optionally truncated and separated by blank low walls (partitions, also known as bridges), K101.

All these cells or reservoirs are in this case surrounded by a rule, i.e. a very narrow notch which fills up with ink but limits spreading of the ink from the cells in order to give the printed image a continuous, precise outline, so defining the limit of the window in a precise and predetermined manner.

Figure 12A:
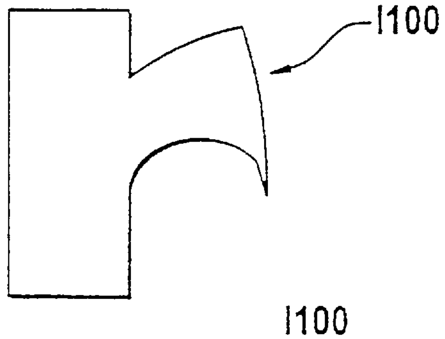
FIGS. 12A–12D show the production of the engraved surface of the photogravure window in greater detail.
Figure 12B:
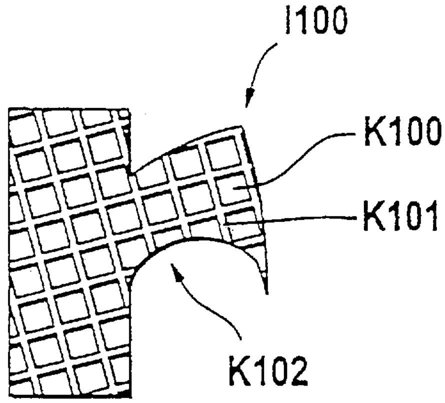

In FIG. 12B, this rule K102 passes contiguously over the reservoirs or adjacently thereto.

Figure 12C:
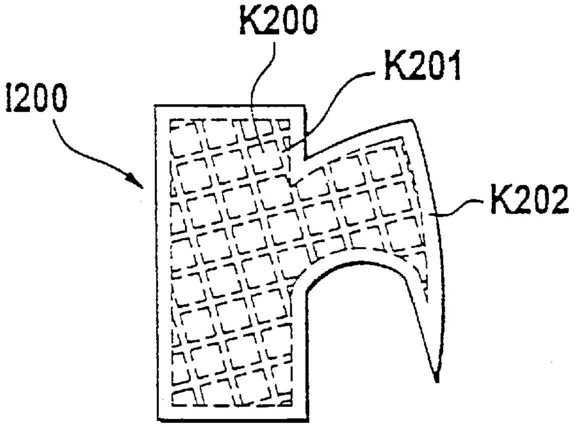

In the case of FIG. 12C, the window 1200 also comprises cells K200 separated by low walls K201, the whole being surrounded by a rule K202 which is further from the edge of said cells K200 (whether truncated or not) than in the embodiment in FIG. 12B.

The fineness of the line constituting the rule depends upon the resolution of the plotter which drew the window or windows; thus, the types of engraving shown in FIGS. 12B and 12C are selected on the basis of the viscosity of the liquid used for printing. As stated, once dried, this liquid is a passivity agent, i.e. is inert with regard to the physico-chemical action to be performed.

Figure 12D:
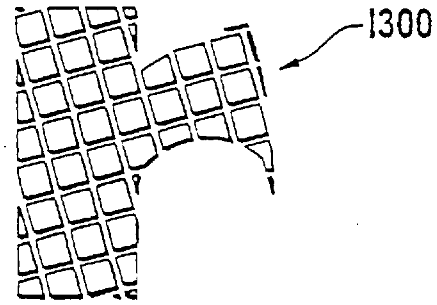

Finally, FIG. 12D shows the printed image 1300 with its very precise, unstepped outline.

Figure 13:
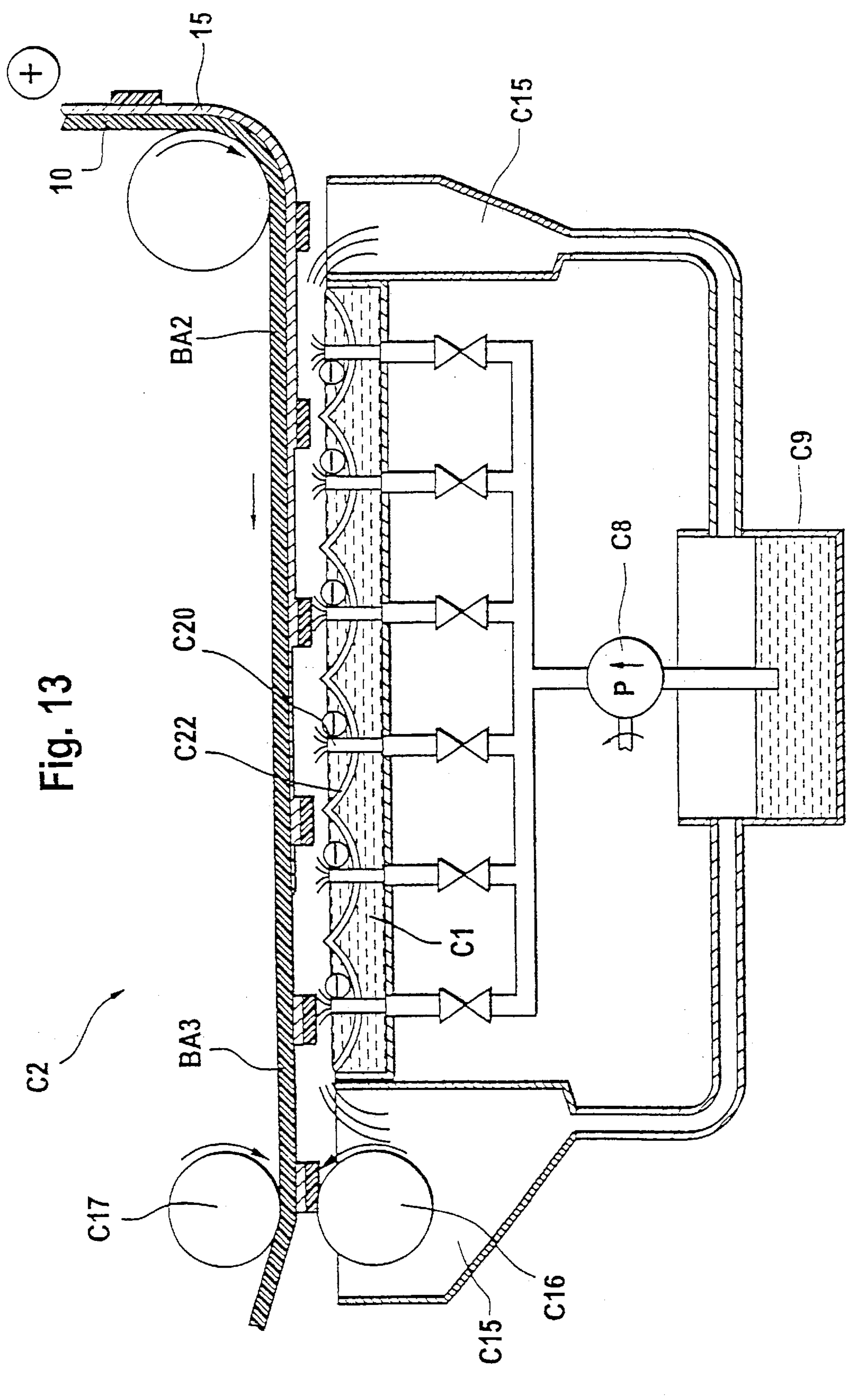

To return to FIG. 9, the electrolysis station C comprises an electrolysis tank C1 which is skimmed by the strip BA2, which has been printed in the printing station B. Said electrolysis station also comprises an extractor hood C2 for the electrolysis gases. Station C2 is shown in detail in FIG. 13.

The electrolysis tank C1 is equipped with an overflow to discharge the surplus electrolyte C9 in such a manner as to maintain a constant level of electrolyte C9. Said electrolyte is discharged into a funnel C15 which leads to a pump C8 which in turn returns the electrolyte to the electrolysis tank C1. At the outlet, there is a collection funnel C15 which collects the liquid dripping from the strip BA3 which has been wrung out by passing between two rollers C16, C17. The wrung out liquid is collected in the funnel C15 and returned to the reservoir C9.

The electrolysis tank may be used either to engrave the film BA2 or to provide a metallic deposit on said film BA2.

When the tank is used for engraving, the printed film BA2 is negatively polarised and skims an electrolyte C9 at a distance of a few millimeters from the tips of a titanium type metallic anode C20 which is insoluble during electrolysis and is negatively polarised. The shape of the anode is obtained by folding a metal sheet. A PVC insulator C22 is arranged between each point of said anode C20. Said electrolyte C9 is selected such that the products released into the aqueous phase by electrolysis attack the metallic coating 15, but not the impression I. Said electrolyte C9 attacks the metal with a mixture of the acidic type and the salts thereof or alternatively of the basic type and the salts thereof. NaOH+NaCl are preferably used in proportions by weight of 10% relative to the weight of water. The conditions under which electrolysis is performed depend upon the nature of the metal to be electrolysed. Said electrolyte C9 removes the metallic coating 15 from the film B2 in those areas not protected by the impression I.

When the tank is used to provide a deposit, the printed film BA2 is positively polarised and skims an electrolyte C9 at a distance of a few millimeters from the tips of a metallic anode C20 which is soluble during electrolysis and is negatively polarised. The shape of the anode is obtained by folding a metal sheet. A PVC insulator C22 is arranged between each point of said anode C20. An electrode of copper and an aqueous electrolyte consisting of 220 g/l of $CuSO_4$ and 20 g/l of $H_2SO_4$ will preferably be selected to provide a copper deposit. The current applied will advantageously be 10 A/dm$^2$.

Finally, the window printing and electrolysis operations may be repeated with different shaped windows one on top of the other, for example to create an integrated circuit, in which case there will be a succession of alternating stations B, C and optionally D.

The film BA3 then passes into the washing station D. This washing station rinses the strip BA3 to remove any electrolyte residues and to dissolve the coating layer, in particular the passivity layer. This washing station D consists of various return rollers D1, D2 conveying said strip BA3 into a first tank D4 and then into a second tank D5. These tanks contain an electrolyte rinsing liquid and/or a coating solvent. The detailed structure of these washing tanks will not be described. The system comprises a set of rollers which define a conveying route for the strip through the washing bath.

Washing is performed by wringing out between steel rollers and polymer rollers in order to limit drive and to facilitate evaporative drying of the washing liquid, such that the film is dry and comprises no traces of electrolyte which are incompatible with its subsequent use.

Downstream from the washing station D, the strip BA4 passes into the drying station E equipped with air ventilation and extraction means E1, E2, E3, E4 and, finally, the dried strip BA5 passes into an inspection station F equipped with a video camera F1 which views an area of the film BA5 to monitor production quality. This inspection is complemented by a measurement of optical density and resistivity (not shown). These inspection measures are carried out continuously. At the outlet from the inspection station F, the film is wound in a winding station G. Said winding station is of a similar construction to the unwinder A, but operates in the reverse direction. It comprises a support G1 fitted with a motor and forming the reel G2.

After inspection of the strip, the strip is fed in and wound onto a reel under controlled tension such that it is not deformed by the extra-thick areas.

Figure 1A:
Figure 1B:
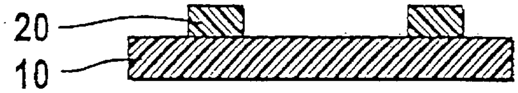
Figure 1C:
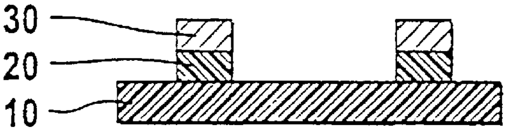
Figure 2A:
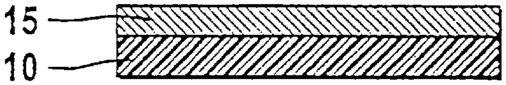
Figure 2B:
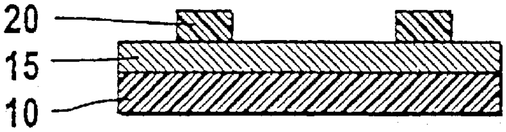
Figure 2C:
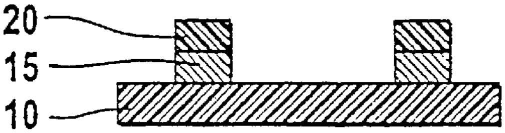
Figure 3A:
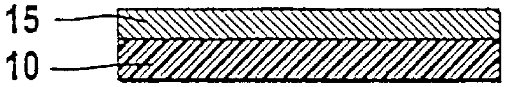
Figure 3B:
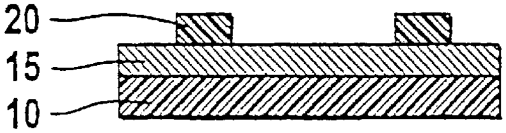
Figure 3C:
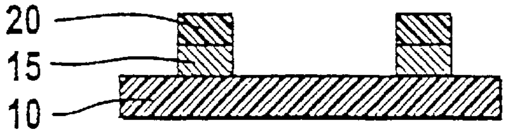
Figure 3D:
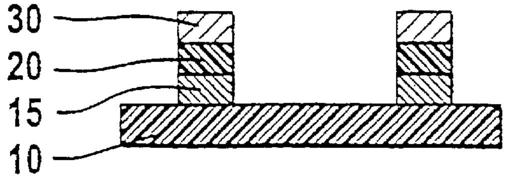
Figure 4:
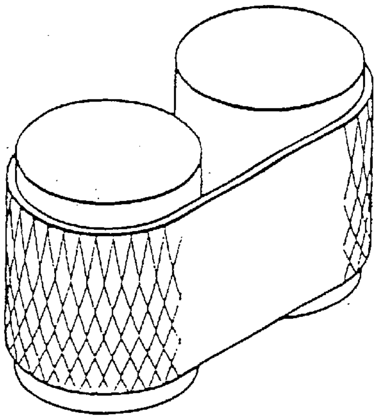
Figure 5:
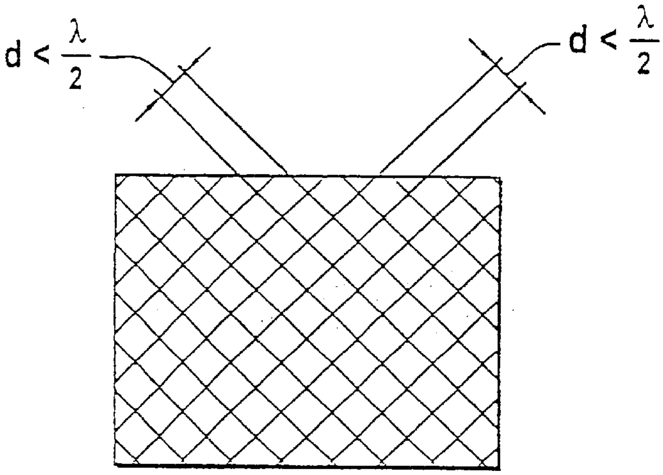
Figure 6:
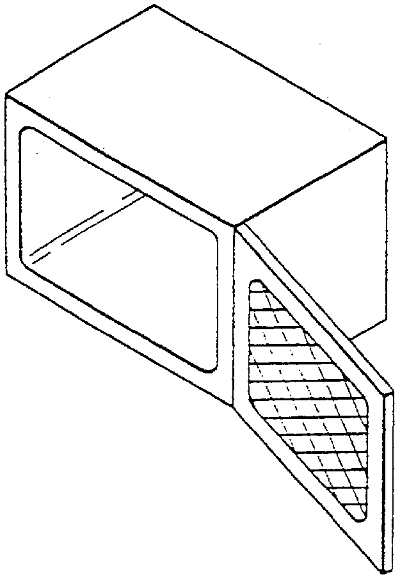
Figure 7:
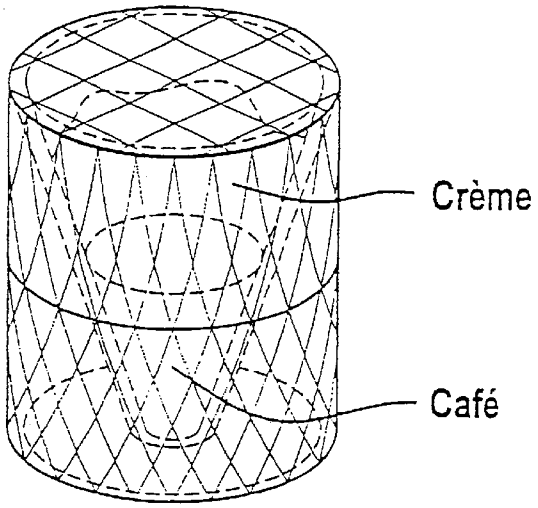
Figure 8:
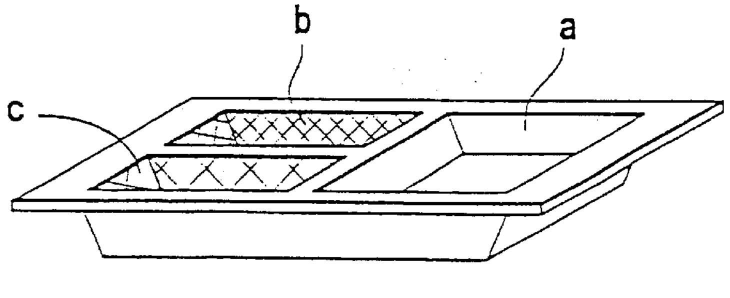
Figure 9:
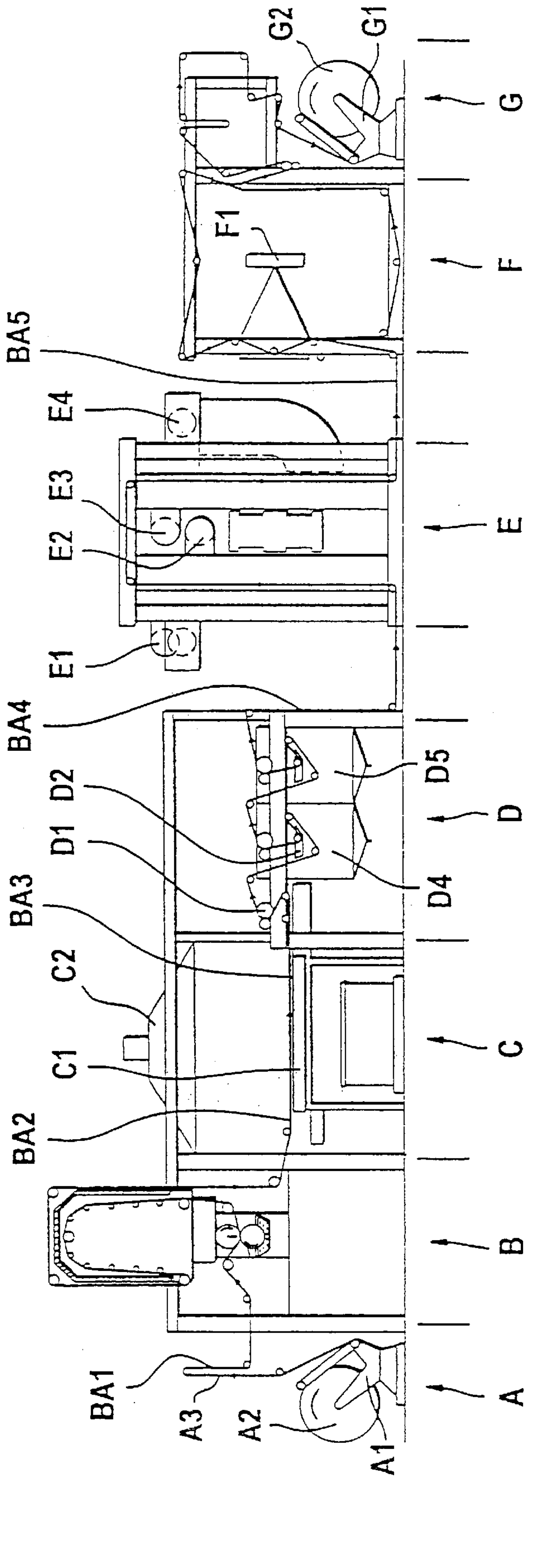
Figure 10:
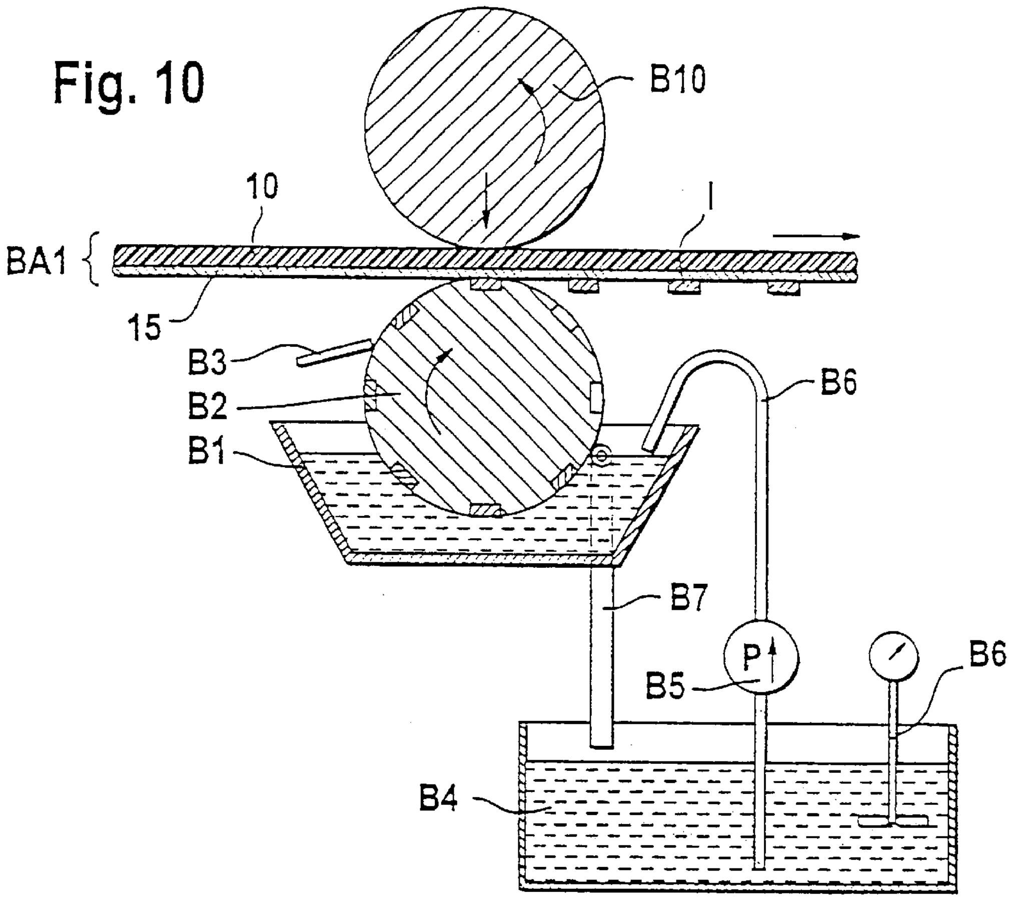
Figure 11:
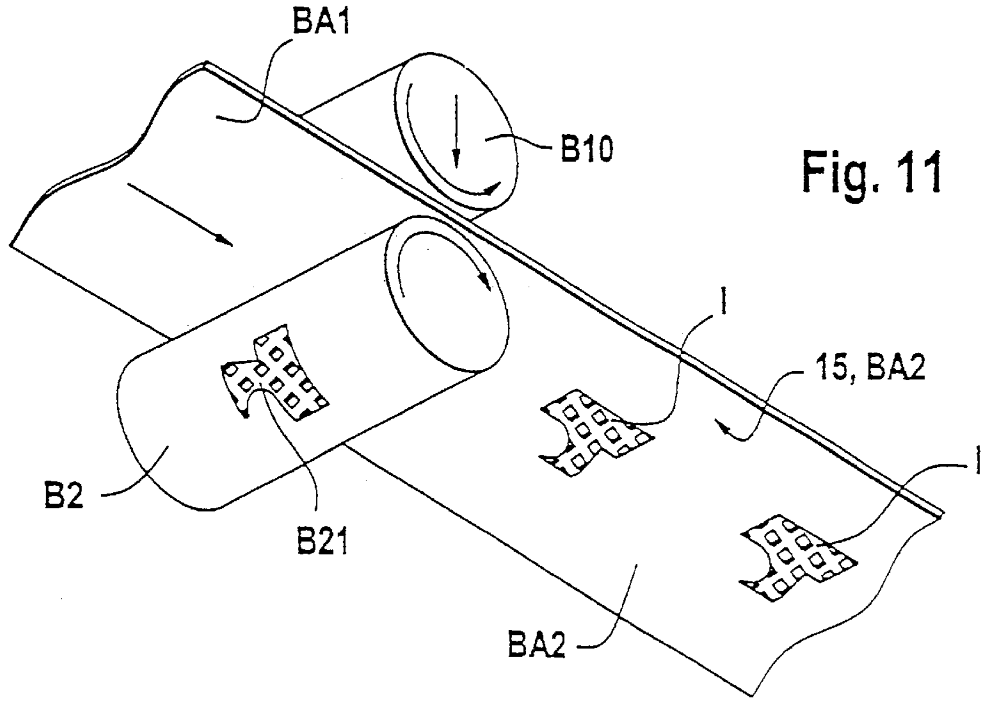

The strip is guided through the installation of FIG. 9 in a synchronised manner by means of register marks and sensors together with control circuits, none of which are shown.

The installation has the advantage of a treatment speed which may exceed a treatment speed of 250 m/min. Treatment is unaffected by the presence of metallic oxides which protect the metallised side of the film, which is a particular advantage in comparison with the prior chemical process. The possibility of depositing a metallic layer of a different nature to that which has been corroded makes it possible to produce metallic multilayers.

The resolution of the metallised line is the same as the printing resolution because the thickness of the corrosion mask may be 2 microns or less.

Finally, with regard to convenience of production, printing of the corrosion resist may be performed on a machine which is independent of the treatment machine.

The process and installation described allow the production of a film comprising multiple layers of insulating and conductive materials, insulating and metallic materials capable of being used when printing materials.

Depending upon the nature of the energy conversion layer comprising the coating of the printed lacquer or lacquers optionally containing a filler, the electrolytic deposit or deposits and the electrolytic engraving or engravings, it is possible to produce materials, the composition of which will be determined by the desired electromagnetic energy conversions and even to produce barriers to electromagnetic radiation for certain wavelengths and, optionally, to combine both options in order to provide products which, as a function of wavelength, are both absorbent and reflective.

EXAMPLE

Electromagnetic waves penetrate as a function of frequency. The higher is the frequency, the greater the penetration of the wave.

In absorbent materials, when an incident wave is stopped, its energy is absorbed.

In reflective materials, the incident wave does not penetrate and is reflected. The incident energy is equal to the reflected energy.

In transparent materials, the energy of the incident wave which passes through unobstructed, without reflection and without absorption is equal to the transmitted energy.

Depending upon the nature of the material and the wave, the normal situation is for all three phenomena to occur; complete reflection and complete transmission are the two extremes.

In the case of microwaves, as a function of the thickness of the aluminium, it has been found that a layer thickness of 1 micron causes reflection of the incident wave, with neither absorption nor transmission. A layer of aluminium 1 micron in thickness is said to be opaque to microwaves.

In the thickness range from 10 Å (angstrom) to 600 Å of aluminium, part of the incident energy is reflected, part is transmitted and the balance absorbed and converted into heat.

Thick layers promote reflection, while thin layers promote transmission.

Absorbed energy is at its maximum for aluminium layer thicknesses of the order of 50 Å.

A coating, which will be the function of the aim to be achieved will be deposited on a support of the polyester type. Removal of the coating will cancel the effect. The effect of the coating will be enhanced by increasing the lacquer filler and still further enhanced by providing an electrolytic deposit.

Polyester is coated with a layer of aluminium of resistivity 0.001 ohm/square by vacuum sublimation. A skin temperature on the polyester film of 200° C. may be achieved (30% of incident energy is absorbed).

Part of the film is demetallised. In this demetallised zone, the microwave energy will no longer be absorbed; since the polyester is transparent to microwaves, all the microwave energy will be transmitted (no reflected energy). Said polyester is said to be transparent to microwaves.

A lacquer containing an aluminium filler of a conductivity of 0.0005 ohm/square is printed onto the same coated film. A material of a conductivity of 0.0015 ohm/square is obtained. A material which can reach a skin temperature of 280° C. is obtained.

A complementary 400 Å metallic deposit is provided. The material then becomes reflective to microwaves. Transmitted energy approaches 0 and the material is opaque to microwaves.

The nature of the coating, the fillers and the electrolytic deposit or deposits is selected as a function of the nature of the incident waves (frequency) and the desired effect (reflection, transmission and absorption).

In the same manner, lead may also be used as a barrier to X rays.

What is claimed is:

1. A multilayer product comprising the following layers:
   - a base support made from a material transparent to visible light and to electromagnetic waves,
   - at least one metallic coating covering less than 5% of the area of the support, said metallic coating being applied at a resolution between 25 and 150 $\mu$M,
   - at least one layer of lacquer covering the metallic coating,
   - wherein the coating is arranged on the support in a pattern invisible to the naked eye, and filters a specific range of electromagnetic waves.

2. A product according to claim 1, wherein an additional metallic coating covers the lacquer.

3. A product according to claim 1, wherein the base support is a polyester film.

4. A product according to claim 1, wherein the product absorbs between 0 and 95% of the incident waves, and reflects between 0 and 100% and/or transmits between 0 and 100% of the non-absorbed waves as a function of the pattern and the nature and quantity of the coating.

5. A product according to claim 4, wherein the product absorbs from 0 to 50% of electromagnetic wave energy and reflects and/or transmits the non-absorbed energy.

6. A product according to claim 1, wherein the product comprises a filter for electromagnetic waves and is transparent to visible light.

7. A product according to claim 1, wherein the product comprises a filter which is opaque to electromagnetic waves and is transparent to visible light.

8. A product according to claim 1, wherein the base support is transparent to microwaves.

9. A product according to claim 1, comprising packaging for microwaveable products.

10. A multilayer product comprising the following layers:
   - a base support made from a material transparent to visible light and to electromagnetic waves,
   - a lacquer covering less then 5% of the area of tie support, said lacquer being applied at a resolution between 25 and 150 $\mu$m,
   - at least one metallic coating covering the lacquer and filtering a specific range of electromagnetic waves,
   - wherein the lacquer is arranged on the support in a pattern invisible to the naked eye.

11. A product according to claim 10, wherein an additional layer of lacquer covers the metallic coating at least in part.

12. A product according to claim 11, wherein an additional metallic layer covers the additional layer of lacquer.

13. A product according to claim 10, wherein the base support is a polyester film.

14. A product according to claim 10, wherein the product absorbs between 0 and 95% of the incident waves, and reflects between 0 and 100% and/or transmits between 0 and 100% of the non-absorbed waves as a function of the pattern and the nature and quantity of the coating.

15. A product according to claim 10, wherein the product comprises a filter for electromagnetic waves and is transparent to visible light.

16. A product according to claim 10, wherein the product comprises a filter which is opaque to electromagnetic waves and is transparent to visible light.

17. A product according to claim 10, wherein the base support is transparent to microwaves.

18. A product according to claim 10, comprising packaging for microwaveable products.

19. A process for producing a product having high resolution patterns on a support comprising the following steps:
   - printing the support with a lacquer applied at a resolution between 25 and 150 micrometers;
   - coating the lacquer with a metallic coating;
   - treating the product by electrolysis; and
   - washing and drying the product;
   - the lacquer covering less than 5% of the area of the support and the metallic coating comprising a metal or metals, one or more oxides, or one or more metal or metalloid salts.

20. A process according to claim 19 further comprising the step of printing the metallic coating with an additional layer of lacquer, wherein the additional layer of lacquer covers the metallic coating at least in part.

21. A process according to claim 20 further comprising the step of coating the additional layer of lacquer with an additional layer of metallic coating.

22. A process according to claim 20 wherein the lacquer is arranged on the support in a pattern invisible to the naked eye.

23. A process according to claim 19 wherein the lacquer is printed onto the support by photogravure.

24. A process according to claim 23 wherein photogravure is performed by one or more photogravure units, said photogravure units comprising at least one cylinder having printing zones consisting of engraved cells, wherein outermost cells of each printing zone are interconnected to ensure linear continuity of printing zone outlines.

25. A process according to claim 19 wherein the step of treating the support by electrolysis comprises electrolytic engraving of the coating on a portion of the support not printed with the lacquer.

26. A process according to claim 25, wherein the step of treating the support by electrolysis comprises electrolytic deposition on a printed portion of the support after the step of washing and drying.

27. A process according to claim 25, wherein said electrolytic engraving is performed by immersing the support and an anode in an aqueous electrolyte and passing a current therethrough.

28. A process according to claim 27, wherein the anode is a titanium anode in the form of a folded titanium sheet.

29. A process according to claim 27, wherein the aqueous electrolyte comprising an inorganic acid and its salt or an inorganic base and its salt, preferably NaOH+NaCl at a concentration of 10% by weight.

30. A process for producing a product having high resolution patterns on a support comprising the following steps:

coating the support with a metallic coating applied at a resolution between 25 and 150 micrometers;

printing the metallic coating with a layer of lacquer, treating the product by electrolysis;

washing and drying the product;

the metallic coating covering less than 5% of the area of the support and comprising a metal or metals, one or more oxides, or one or more metal or metalloid salts.

31. A process according to claim 30, further comprising the step of coating the lacquer with an additional layer of metallic coating, wherein the additional layer of metallic coating covers the lacquer at least in part.

32. A process according to claim 30, wherein the lacquer is printed onto the support by photogravure.

33. A process according to claim 32 wherein photogravure is performed by one or more photogravure units, said photogravure units comprising at least one cylinder having printing zones consisting of engraved cells, wherein outermost cells of each printing zone are interconnected to ensure linear continuity of printing zone outlines.

34. A process according to claim 30, wherein the step of treating the support by electrolysis comprises electrolytic engraving of the coating on a portion of the support not printed with the lacquer.

35. A process according to claim 34, wherein the step of treating the support by electrolysis comprises electrolytic deposition on a portion of the support after the step of washing and drying.

36. A process according to claim 34, wherein said electrolytic engraving is performed by immersing the support and an anode in an aqueous electrolyte and passing a current therethrough.

37. A process according to claim 36, wherein the anode is a titanium anode in the form of a folded titanium sheet.

38. A process according to claim 37, wherein the aqueous electrolyte comprises an inorganic acid and its salt or an inorganic base and its salt, preferably NaOH+NaCl at a concentration of 10% by weight.

* * * * *